United States Patent [19]

Rouse et al.

[11] Patent Number: 5,525,108

[45] Date of Patent: Jun. 11, 1996

[54] CLEANING SYSTEM FOR AN AGRICULTURAL COMBINE

[75] Inventors: Paul L. Rouse, Moline; Joseph T. Basala, Rock Island, both of Ill.

[73] Assignee: Case Corporation, Racine, Wis.

[21] Appl. No.: 284,345

[22] Filed: Aug. 2, 1994

[51] Int. Cl.[6] .................................... A01F 12/32
[52] U.S. Cl. ............................... 460/101; 460/94
[58] Field of Search ....................... 460/101, 100, 460/102, 94, 95

[56] References Cited

U.S. PATENT DOCUMENTS

| | | | |
|---|---|---|---|
| 673,210 | 4/1901 | Lippy. | |
| 747,231 | 12/1903 | Rumely. | |
| 841,857 | 1/1907 | Garlits et al. | |
| 1,248,686 | 12/1917 | Lindh. | |
| 1,366,691 | 1/1921 | Humbke. | |
| 1,462,804 | 7/1923 | Evans. | |
| 2,250,383 | 7/1941 | Koester | 209/22 |
| 2,554,416 | 5/1951 | Morrissey | 209/394 |
| 3,021,009 | 2/1962 | Scott | 209/394 |
| 3,334,744 | 8/1967 | James et al. | 209/394 |
| 3,472,378 | 10/1969 | Payne | 209/394 |
| 3,800,803 | 4/1974 | Rouse | 130/24 |
| 4,474,188 | 10/1984 | Kashino et al. | 130/27 |
| 4,502,493 | 3/1985 | Jones et al. | 130/24 |
| 4,712,568 | 12/1987 | Strong et al. | 130/272 |
| 4,863,415 | 9/1989 | Carnewal et al. | 460/101 |
| 4,897,071 | 1/1990 | Desnijder et al. | 460/101 X |
| 4,897,072 | 1/1990 | Bestland | 460/99 |
| 5,041,059 | 8/1991 | Ricketts et al. | 460/101 |
| 5,176,574 | 1/1993 | Matousek et al. | 460/100 |

FOREIGN PATENT DOCUMENTS

| | | | |
|---|---|---|---|
| 1496699 | 7/1989 | U.S.S.R. | 460/101 |
| 1561890 | 5/1990 | U.S.S.R. | 460/102 |

*Primary Examiner*—Terry Lee Melius
*Attorney, Agent, or Firm*—Rudnick & Wolfe

[57] ABSTRACT

An agricultural combine cleaning system including a cleaning sieve having a series of generally parallel slat rows arranged in at least first and second cleaning sections. A first series of passages is provided between adjacent slat rows of the first cleaning section while a second series of passages is defined between adjacent slat rows of the second cleaning section. A slat adjustment assembly having a single controller is provided for adjusting the first and second passages in the first and second cleaning sections simultaneously in response to movement of the single controller. The controller is threadably connected to an actuator whose endwise disposition controls the angular displacement of the slat rows and thereby the passages between adjacent slat rows. The threaded connection between the actuator and the rotatable controller is located in a cavity or chamber which is sealed to prevent contaminates from interfering with the threaded connection thereby facilitating adjustment of the slat rows on the combine sieve.

30 Claims, 3 Drawing Sheets

CLEANING SYSTEM FOR AN AGRICULTURAL COMBINE

FIELD OF THE INVENTION

The present invention relates to agricultural combines, and more particular to a cleaning system for an agricultural combine.

BACKGROUND OF THE INVENTION

Agricultural combines are known in the art to harvest a variety of different types of grains. As used herein, the term "grain" is meant to include corn, wheat, rye, oats, barley, flax seed, sorghum, soy beans, mixed grain, and any other food grains, feed grains, and oil seeds.

Under normal operating conditions, the combine will reap the grain stalks through a crop harvesting apparatus that is designed for the particular crop being harvested. An infeed apparatus is connected between the frame of the combine and the crop harvesting apparatus to transfer the crop into a separating apparatus. The separating apparatus threshes the harvested crop materials to separate grain from the material other than grain.

While the separating apparatus acts to separate a substantial portion of the crop or grain from the material other than grain, some chaff and/or straw remains intermixed with the grain and a further cleaning or separating action is normally required. This further separation is normally achieved in a cleaning section of the combine.

The cleaning section of a combine is generally located beneath the separating apparatus. The cleaning section of a typical agricultural combine includes two or more reciprocally mounted sieves with a fan that blows air upwardly through the sieves. The reciprocation of the sieves facilitates arrangement of the grain and other materials in a crop layer, or mat, on top of the sieves.

Each sieve of the cleaning section preferably includes a series of adjacent slats or louvers. A series of transversely elongated openings or passages are defined between the confronting upper and lower surfaces of adjacent slats. The elongated openings or passages separate the material such that grain is allowed to fall through the openings but causing larger pieces of material other than grain to be moved rearward and off the sieves.

Separation of the crop material is facilitated by the air from the fan flowing upwardly through the sieves. The upwardly directed air creates a force which urges residue material, including straw, chaff and the like, to float on top of the sieve and into an airborne state such that it may be directed toward and expelled from a discharge end of the combine. On the other hand, the clean grain tends to move to the sieve and fall through the openings or passages between adjacent slats into a clean grain collector as they are heavier than the other materials.

To enhance versatility of the combine such that it can be used to harvest more than one type of grain, the slats on the cleaning sieves are angularly adjustable relative to one another. The angular adjustability of the slats allows the size of the openings or passages between adjacent slats to be changed to control the size of the material that is allowed to fall through the passages or openings, as well as to regulate the upward flow of air through the sieves thereby achieving the desired degree of material separation.

To further enhance the efficiency of the combine, each cleaning sieve is typically divided into sections. Each sieve section comprises a series of slats or louvers which are similarly disposed relative to each other for separating the material deposited onto that particular section of the sieve. Configuring the sieve with various sections allows the openings or passages between the various sections to be sized. Further, the various sections of the cleaning sieve can be adjusted relative to one another in such a way that the openings between adjacent slats of certain sieve sections can be sized proportionately relative to other sieve sections. This allows a broader distribution of the crop layer or mat along the length of the sieve to promote the passage of air therethrough thereby promoting the cleaning efficiency of the cleaning section of the combine.

To adjust the different sieve sections a series of levers or handles together with a series of connecting linkages are normally provided in association with each sieve. More specifically, an adjusting lever is connected to each sieve section as through a linkage to angularly adjust the slat rows in a particular sieve section. Certain sieve sections, mainly in the rear of the sieves, require only infrequent adjustment. Each lever or handle must be independently adjusted to effect the desired openings between adjacent slats of a particular sieve section.

The disadvantages of these prior arrangements reside mainly in that proper adjustment of the openings is difficult to attain. Also, it is almost impossible to repeatedly return the slats to precisely their originally set position following adjustment thereof. Providing a lever or handle along with connecting linkage for each sieve section increases the manufacturing costs of the sieve and of the combine. As will be appreciated, providing a lever or handle together with a connecting linkage for each sieve section furthermore increases maintenance costs and requires an additional inventory of parts to maintain the sieves in proper working order.

Because of the several drawbacks associated with rising levers to effect proper adjustment of the openings between the sieves, it is known to provide a rotatable knob to replace the adjusting lever or handle of heretofore known sieve adjustment assemblies. In such arrangements, the rotatable knob is typically arranged in threaded association with an elongated nonrotatable linkage which endwise moves in response to turning of the rotatable knob thereby resulting in adjustment of the angular relationship of the slats relative to each other. While offering improved sieve adjustment abilities, such rotatable knobs did little or nothing to reduce the number of parts required for effecting adjustment of the various cleaning section of the combine sieve.

During their operation, combines generate a great deal of dust and dirt. The reciprocating action of the sieves coupled with the blowing action of the fan causes the environment in the cleaning area of the combine to be particularly laden with particles of dirt and dust. These dirt and dust particles cause numerous problems when they find their way into certain places within the combine. One of the major problems caused by such dirt and dust particles is the freezing of parts that are normally in movable relation to one another thereby not allowing relative motion between the otherwise movable pans. This is especially true in those situations where rotatable knobs are used to adjust the openings in a particular section of the cleaning sieve. The dust and dirt particles often contaminate the threaded connection between the rotatable knob and the linkage making it difficult if not impossible to turn the knob to adjust the slats angular relationship relative to one another.

Another problem with some known cleaning systems is that grain tends to congregate toward a forward area of the sieves. The front cleaning section of the sieve is substantially closed or has a very small opening between adjacent slats of that section so that the materials will tend to move towards the rear section of the sieve thereby spreading the crop layer or mat over a greater area. It is difficult, however, for the operator to properly adjust the angular disposition of the sieves thereby adjusting the openings between adjacent slats in the front section of the sieve relative to the adjustment of the angular disposition of the slats at the adjacent lengthwise sections of the sieve.

The foregoing illustrates numerous problems and limitations of the known prior art mechanisms. Thus, it is apparent that it would be advantageous to provide a cleaning system which embodies sieves having more than one adjustable section and wherein the adjustable sieve sections are controlled by one mechanism. It would also be advantageous to provide a sieve adjustment mechanism including a rotatable controller that is threadably connected to an elongated slat adjustment member wherein the threaded connection between the adjustment member and the controller is protected frown being contaminated with dust and dirt particles natural to the combine environment.

SUMMARY OF INVENTION

In view of the foregoing, and in accordance with the present invention, there is provided a cleaning system for an agricultural combine including a separating apparatus for threshing or separating grain from material other than grain. A salient feature of the cleaning system is a cleaning sieve including a series of generally parallel slat rows arranged in at least first and second cleaning sections. A first series of clean grain passages are defined in the first cleaning section of the sieve while a second series of clean grain passages is defined in a second cleaning section of the sieve. The grain passages in the cleaning sections are generally narrow in a first direction and are elongated in a second direction to promote the separation of grain from material other than grain. A slat adjustment assembly, including a slat adjusting member individually connected to each of the slat rows of the first and second cleaning sections and responsive to manipulation of a single operator accessible controller, is provided for simultaneously adjusting the grain passages in both of the cleaning sections.

The cleaning sieve further includes a rigid, substantially rectangular frame. The frame includes a forward edge, a rear edge, and a pair of opposed side edges joining the forward and rear edges. The slat rows of the first and second cleaning sections are arranged in adjacent and generally overlapping relation relative to each other and extend generally parallel to the front and rear edges of the frame. Each slat row is supported for angular movement about a pivot axis defined by an elongated pivot member connected to a respective slat row and whose opposite ends are pivotally supported by the frame.

When the slat rows are in their fully open position, the grain passages in the first cleaning section are smaller in the first direction than are the grain passages in the second cleaning section. By this design, the crop materials deposited onto the sieve are separated as they pass from one end of the sieve to the other end. In the illustrated embodiment of the invention, the first and second cleaning sections are arranged in a fore-and-aft relationship relative to each other. In one form of the invention, the first cleaning section defines about 12% to about 20% of the total cleaning area of the sieve while the second cleaning area defines about 60% to about 75% of the total cleaning area of the sieve. The sieve may further include a third section which comprises the remainder of the cleaning area of the sieve.

The cleaning system further includes a first set of connectors for individually connecting the slat rows comprising the first cleaning section to the adjustable member of the adjustment assembly and a second set of connectors for individually connecting the slat rows comprising the second cleaning section to the adjustable member of the adjustment assembly. Notably, one set of connectors has a different effective length than the other set of connectors whereby allowing simultaneous angular displacement of the slat rows but at differing degrees of angular movement about their respective pivot axes in response to displacement of the adjustment assembly. In a preferred form of the invention, the connectors in each set of connectors comprises a crankarm formed intermediate the ends of the pivot member associated with each of the slat rows. The crankarms associated with the slat rows forming the first cleaning section have a different effective length than the crankarms associated with the slat rows forming the second cleaning section.

Another aspect of the present invention relates to a new and unique structuring of an adjustment assembly used to adjust the angular disposition of slat rows on a combine sieve so as to regulate the size of the openings defined between adjacent slat rows. The adjustment assembly is connected to linkage including an adjustable member which is connected to the slat rows on the combine sieve. The adjustment assembly includes a controller mounted for rotation about an axis and inhibited from moving along the rotational axis. The controller preferably includes a drive portion and a shank portion. In the illustrated embodiment, the shank portion of the controller defines a threaded section arranged in axial alignment relative to the rotational axis of the controller.

A nonrotatable elongated actuator is connected at one end to the linkage connecting the adjustment assembly to the slat rows and is threadably connected at the other end to the threaded section of the controller's shank portion. The threaded connection between the threaded section on the controller and the actuator is located in a cavity which is sealed from the contaminates normally present in and about the region of the sieve. The cavity or chamber in which the threaded connection is located is defined by at least one of the shank portion and the actuator. Sealing the cavity prevents contaminates from interfering with the threaded association between the controller and the actuator thereby facilitating adjustment of the slat rows on the sieves.

The adjustment assembly may further include brakes arranged in association with the controller for inhibiting inadvertent rotation thereof. In the illustrated embodiment, the brakes include a pair of annular members arranged about the shank portion of the controller for applying a compressive frictional force against the controller thereby preventing inadvertent rotation of the controller about the fixed axis.

In the preferred form of the invention, the actuator of the adjustment assembly has an elongated configuration which extends endwise through a suitably shaped opening in the combine. The cross-sectional shape of the actuator cooperates with the shape of the opening to allow the actuator to be endwise displaced upon rotation of the controller while preventing rotation of the actuator in response to rotation of the controller.

In a preferred form of the invention, the controller defines, at one end thereof, an internally threaded blind bore extending in axial alignment with the axis of rotation thereof and defining the cavity or chamber which protects the threaded connection between the threaded section on the controller and the actuator from contaminates such as dirt, dust and other particulate matter. A suitable seal is placed about the actuator and is secured to the end of the shank portion of the controller for closing the chamber or cavity from contaiminates. The drive portion of the controller is preferably configured with a tool attachment. The tool attachment allows a suitably shaped tool to be releasably attached to the controller for facilitating adjustment of the slats on the combine sieve. In a most preferred form of the invention, a knob is arranged about and is secured to the controller to facilitate rotation of the controller and thereby adjustment of the sieve.

The present invention advantageously allows simultaneous adjustment of both cleaning sections on the combine sieve with use of a single controller. Using a single controller reduces the number of parts on the combine thereby reducing the manufacturing costs and the maintenance required to properly service the combine sieve. As will be appreciated, simultaneous adjustment of both cleaning sections allows the openings and thereby the separating characteristics between the respective cleaning sections to be proportionately maintained throughout the range of angular or pivotal movement of the slat rows.

The unique structure of the adjusting mechanism facilitates adjustment of the angular disposition of the slats as through a turning or rotational movement rather than through use of a lever actuated mechanism. Using a rotatable controller readily allows adjustment between the slats to be set and reset with considerably less difficulty and far greater degree of precision than with lever arrangements. Moreover, the rotatable controller allows substantially infinite adjustment of the slat rows throughout their range of angular movement. The rotatable controller of the adjustment assembly is threadably connected to the actuator and the threaded connection therebetween is located in a cavity or chamber which is suitably sealed to prevent contaminates from interfering with the threaded connection thereby facilitating adjustment of the slat rows. Moreover, the rotatable controller is an economical and yet reliable mechanism for adjusting the slat rows of the sieve.

Numerous other features and advantages of the invention will become readily apparent from the following detailed description, the appended drawings, and the accompanied claims.

DETAILED DESCRIPTION OF A PREFERRED EMBODIMENT

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 1:
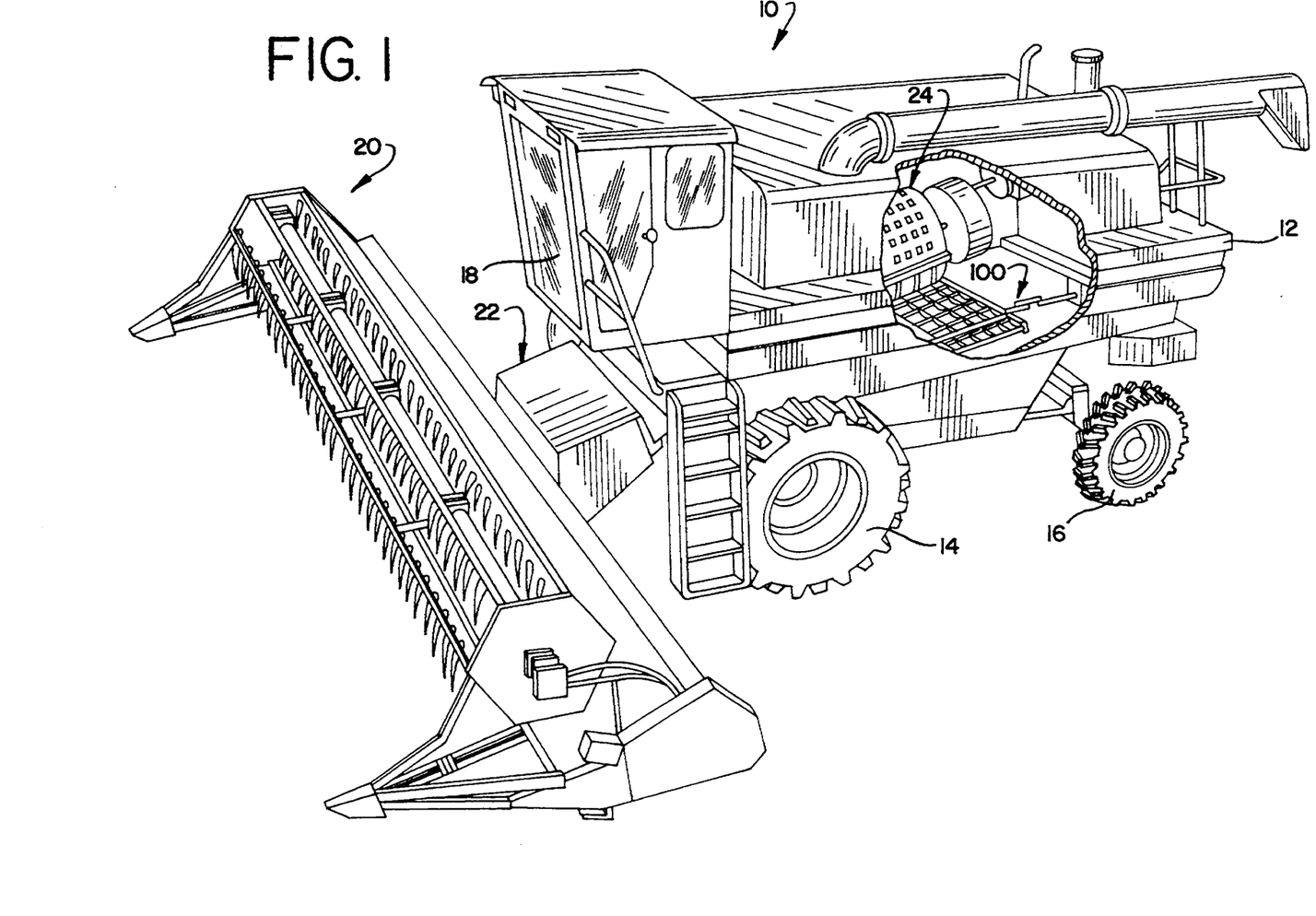
FIG. 1 illustrates a perspective view, partially brokenaway of an agricultural combine to which the present invention applies.

Referring now to the drawings, wherein like reference numerals refer to like parts throughout the several views, there is shown in FIG. 1 a self-propelled combine 10. The combine 10 is preferably of the type marketed by the assignee herein. The combine 10 includes a body or housing 12 supported on front drive wheels 14 and steerable rear wheels 16. The combine is powered by an engine (not shown) and controlled from an operator station 18. A crop harvesting apparatus or header 20 and an infeed mechanism 22 are attached at a forward end of the combine. The infeed mechanism 22 feeds the crop material to a separator apparatus 24 enclosed by housing 12.

Figure 2:
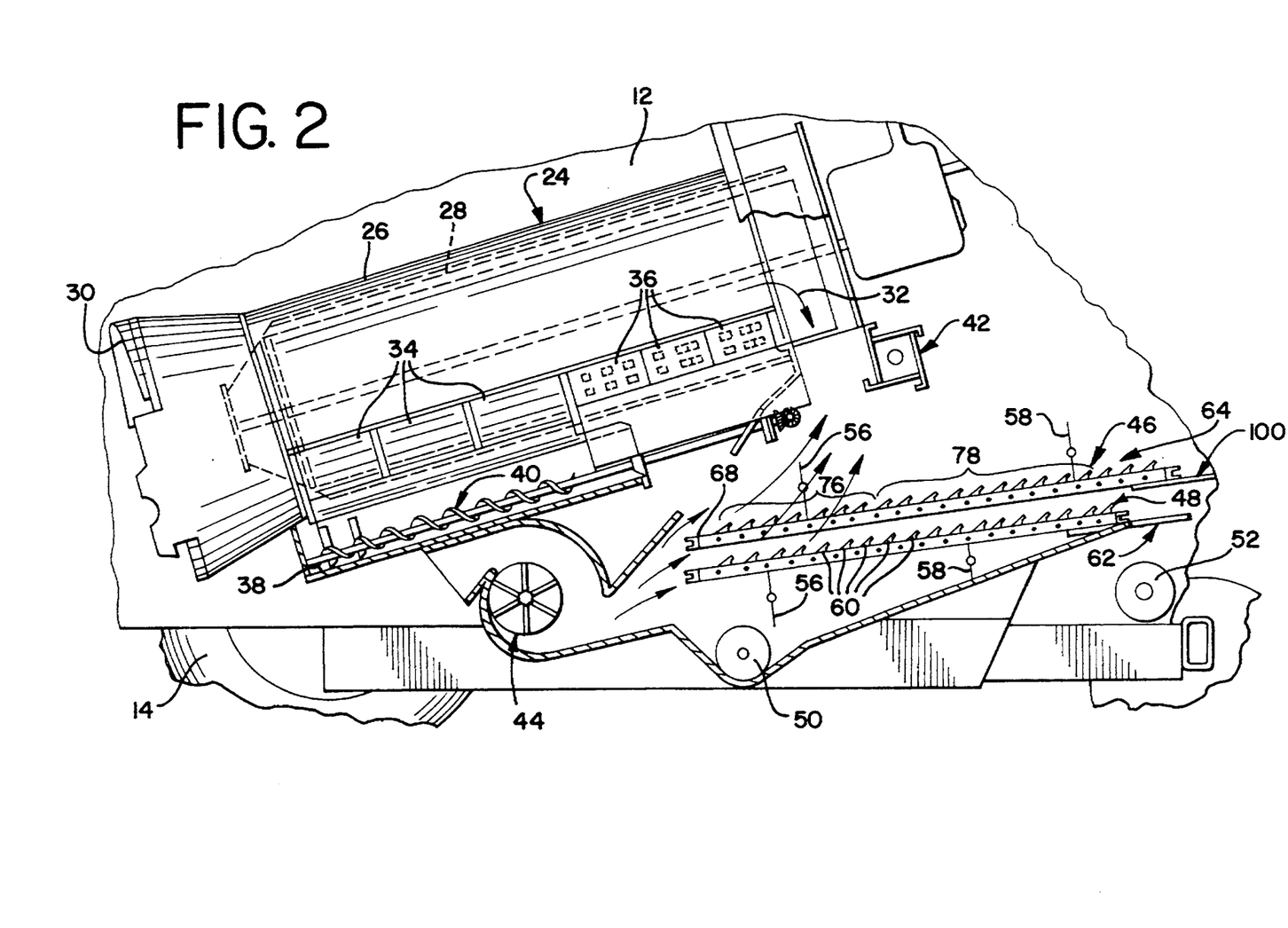
FIG. 2 is an enlarged partial cross-sectional side elevational view of a preferred separating apparatus and cleaning section of a combine.

Turning to FIG. 2, the separating apparatus 24 is preferably a conventional rotary design and includes a threshing cage 26 and a rotor 28. It should be appreciated, however, that the principles of the present invention equally apply to other than rotary combines. As illustrated, the cage 26 has a generally cylindrical and at least partially foraminous configuration with the rotor 28 mounted for rotation therewithin. The rotor 28 is driven from the engine and directs crop material to be threshed from an inlet or upstream end 30 of the separating apparatus toward an exit or downstream end 32.

Between the upstream and downstream ends of the separating apparatus 24, crop or grain is threshed several times repeatedly, but gently, as it spirals around the single large diameter rotor 28 and passes through the threshing cage 26. In a conventional manner, suitable instrumentalities on the rotor 28 co-operate respectively with semicylindrical concaves 34 and semicylindrical grates 36 provided on the threshing cage 26 to thresh the crop material such that most of the grain will be separated and propelled downwardly through the concaves and grates.

Most of the grain passing from the separating apparatus 24 drops into a grain pan 38. The grain is conveyed rearwardly from the pan 38 by an auger mechanism 40 for subsequent cleaning and collection. Straw, tailings, and other waste material is impelled rearwardly out of the discharge end 32 of the separating apparatus 24 where a rotary beater 42 throws the straw and other waste material rearwardly from the combine.

The combine 10 further includes a cleaning system for cleaning chaff, straw, tailings and other foreign matter from the clean grain. In the illustrated embodiment, the cleaning system includes a cleaning fan 44, a chaffer sieve 46 and a shoe sieve 48. The illustrated form of combine further includes, in fore-and-aft relation relative to each other, a conventional clean grain auger 50 for conveying clean grain out of the combine and a return auger 52 which returns unthreshed materials back to the threshing apparatus 24 tier recycling and further cleaning.

Cleaning fan 44 extends transversely across substantially the entire width of the combine 10. More specifically, the fan 44 is transversely mounted for rotation within the housing 12 beneath the separator apparatus 24 and forward of the cleaning sieves 46 and 48 for producing a directed flow of air. The cleaning fan 44 is of a conventional design of the type shown and described in co-assigned U.S. Pat. No. 4,906,219 to R. Matousek et al. Suffice it to say, fan 44 produces a relatively high output (between about 9,000 cfm and about 12,000 cfm over 30 square feet) and a substantially uniform directed airflow upwardly and rearwardly through the cleaning sieves 46 and 48 to urge unwanted chaff and other residue in the threshed grain into an airborne state and toward the discharge end 32 of the separating apparatus 24.

Each sieve 46, 48 is supported in the housing 12 beneath the separating apparatus 24 for receiving and sifting threshed grain received from the separating apparatus 24. Each sieve is located in the housing 12 such that the flow of the air from the fan 44 passes upwardly therethrough to urge residue in the threshed crop material into an airborne state and toward the discharge end of the separating apparatus 24 and away from the sieve. As illustrated, each sieve is supported for fore-and-aft reciprocation or oscillation by a pair of arms 56 and 58. As will be appreciated, reciprocation of the sieve facilitates arrangement of the crop material over the entirety of the sieve and tends to separate the clean grain form the chaff, straw, tailing and other residue material so that the clean grain falls through the sieve.

As shown, the shoe sieve 48 is arranged beneath and in grain receiving relation relative to the chaffer sieve 46. In the illustrated embodiment, the shoe sieve 48 is of conventional structure and preferably includes a series of angularly adjustable slats or louvers 60. In this embodiment, the shoe sieve 48 has a conventional adjusting mechanism 62 arranged in combination therewith for adjusting the angular displacement of the louvers or slats 60.

Figures 3, 4, 5:
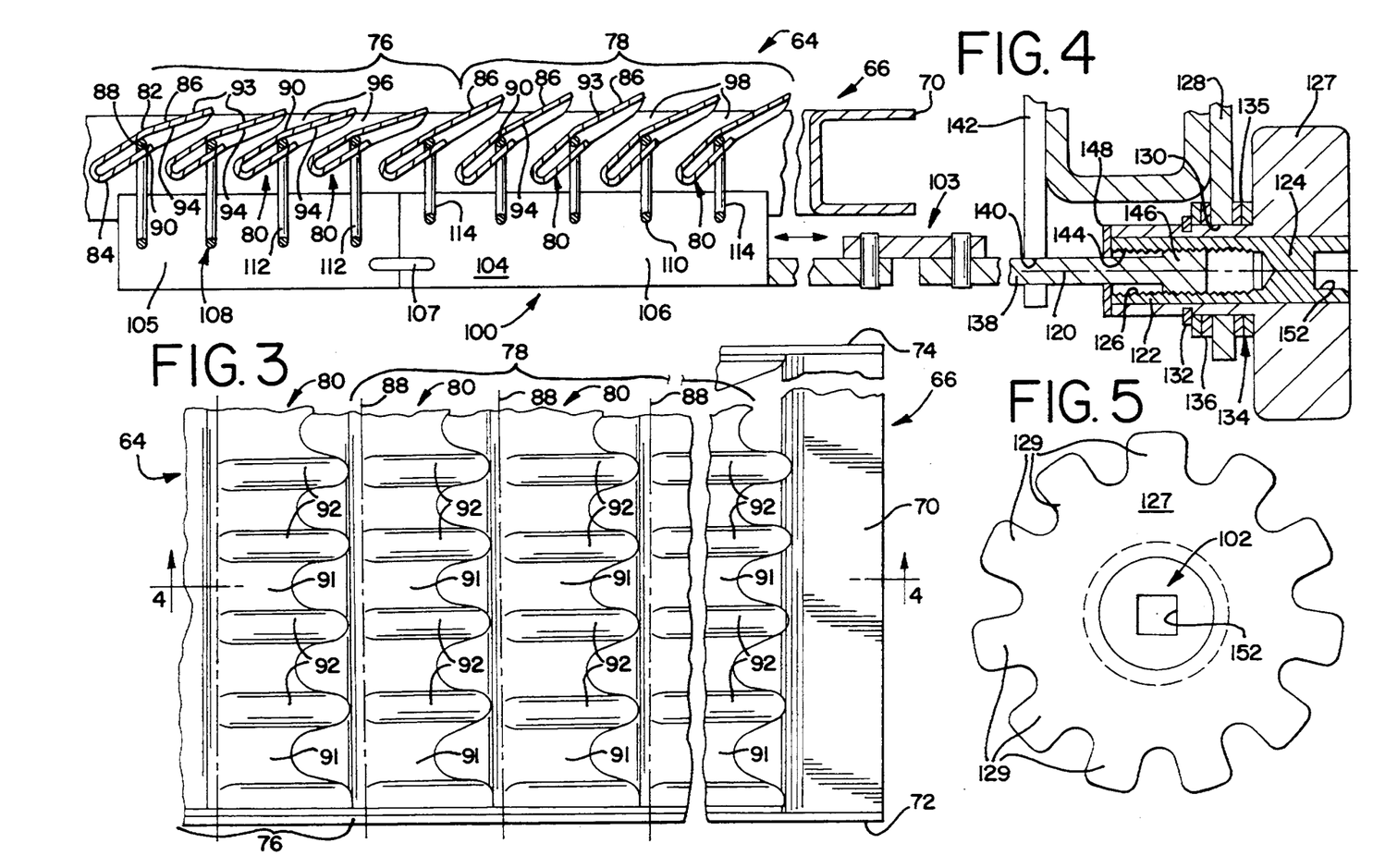
FIG. 3 is a fragmentary top plan view of a cleaning sieve associated with the present invention.
FIG. 4 is a sectional side view taken along line 4—4 of FIG. 3.
FIG. 5 is an end view of a controller forming part of an adjusting mechanism embodying principles of the present invention.

As shown in FIGS. 3 and 4, the sieve 46 defines a grain cleaning area generally designated by reference numeral 64 and which is defined by a rigid generally rectangular frame 66 having a forward or front edge 68 (FIG. 2), a rear edge 70, and opposed side edges 72, 74 (FIG. 3) joined to the front and rear edges 68 and 70, respectively. The cleaning area 64 of the sieve 46 is divisible into at least first and second cleaning sections generally designated by reference numerals 76 and 78, respectively. Because the sieve 46 is disposed in combination with a rotary combine, the cleaning sections 76, 78 are disposed in a fore-and-aft relationship relative to each other. It will be appreciated, however, that in other combine designs the cleaning sections 76, 78 may be disposed in other than a fore-and-aft relationship without departing from the spirit and scope of the present invention. In the illustrated embodiment, the first cleaning section 76 comprises about 12% to about 20% of the total cleaning area of the sieve 46 while the second cleaning section 78 comprises about 55% to about 70% of the total cleaning area of the sieve 46. It will be appreciated that the sieve 46 may include other cleaning sections (not specifically shown) comprising the remainder of the cleaning area 64.

Each cleaning section 76, 78 is comprised of a plurality of generally parallel rows of slats or louvers 80 arranged in adjacent relationship relative to one another and which extend between the opposite side edges 72, 74 (FIG. 3) of the frame 66. Each row of slats in a cleaning section is correspondingly disposed preferably in an overlapping relationship relative to an adjacent slat row. In the illustrated embodiment, the slat rows 80 in each cleaning section 76, 78 are of a conventional structure and are structurally similar. Accordingly, a general description of a slat row will be provided with the differences between the slat rows of the cleaning sections 76, 78 being provided in detail below.

As shown in FIG. 4, each row of slats 80 preferably has a central section 82 with lower and upper leg sections 84 and 86, respectively, extending in angular offset relation from the central section 82. Each slat row 80 in the cleaning sections 76, 78 is mounted on the frame 66 for rocking or angular movement about a pivot axis 88 (FIG. 4) defined by a transversely extending pivot rod or member 90. In the illustrated embodiment, the pivot member 90 is secured to the central section 82 of a respective slat 80 such that they rotate or rock together as a unit about the pivot axis 88. Opposite ends of each pivot member 90 are rotatably supported by the frame 66.

As illustrated in FIG. 3, each slat 80 preferably has a corrugated cross-sectional configuration. The corrugated configuration of each slat 80 includes a series of lower groove portions 91 between raised and adjacent ridge portions 92. In the preferred form of the invention, the groove and ridge portions 91 and 92, respectively, on adjacent slats 80 are in corresponding alignment relative to one another. In a most preferred form of the invention, the groove and ridge portions 91 and 92, respectively, on the slats 80 in the first cleaning section 76 are in corresponding alignment with the groove and ridge portions 91 and 92, respectively, of the slats 80 in the second cleaning section 78 of the sieve 46. Moreover, an outer edge of the upper leg section 84 of each slat 80 has an escalloped configuration or design.

Returning to FIG. 4, the tipper leg section 86 of each slat 80 is provided with a major upper surface 93 and a major lower surface 94. As seen in FIG. 4, a first series of clean grain passages 96 is defined between confronting upper and lower surfaces 93 and 94, respectively, of adjacent slats 80 in the first cleaning section 76. Similarly, a second series of clean grain passages 98 is defined between confronting upper and lower surfaces 93 and 94, respectively, of adjacent slats 80 in the second cleaning section 78. Both the first and second grain passages 96 and 98 in the first and second cleaning sections 76 and 78, respectively, are relatively narrow in a first direction extending transverse to the pivot axis 88 and are elongated in a lengthwise second direction extending generally normal to the first direction. The configuration of the clean grain passages promotes the separation of grain from material other than grain.

Besides separating the crop materials deposited toward the front of the sieve, the slats 80 in the first cleaning section 76 are disposed relative to the frame 66 to promote movement of the crop material toward the second cleaning section 78 of the sieve 46 thereby spreading or moving the crop material mat or layer across a larger area to enhance the ability of the directed air from the fan 44 to separate grain from material other than grain. Because the sieve 46 is arranged in combination with a rotary combine, the angular relationship of the slat rows 80 relative to the frame 66 are configured such that the grain passages 96 associated with the first cleaning section 76 are smaller in a direction extending transverse to the pivot axis 88 of the slats 80 than are the grain passages 98 associated with the second cleaning section 78.

In the illustrated embodiment, and as shown in FIG. 4, the upper leg sections 86 of the slats 80 in the first cleaning section 76 of the sieve have a different angular relationship in a horizontal plane relative to the frame 66 than do the upper leg sections 86 of the slats 80 in the second cleaning section 78 of the sieve 46. More specifically, the differences between the angular relation of the upper leg sections 86 of the slat rows comprising the first and second cleaning sections 76 and 78, respectively, means that, when the slats 80 are in a fully open position, the cleaning passages 96 associated with the first cleaning section 76 measure from about 0.50 inches to about 0.750 inches between confronting upper and lower surfaces 93 and 94, respectively, of adjacent slats 80 while the clean grain passages 98 associated with the second cleaning section 78 measure from about 0.750 inches to about 1.0 inches, between confronting upper and lower surfaces 93 and 94, respectively, of adjacent slats 80.

One salient feature of the present invention concerns the provision of a slat adjustment assembly 100 specifically designed to allow for simultaneous adjustment of the clean grain passages 96 and 98 of both cleaning sections 76 and 78, respectively, through a single operator accessible controller 102. As shown in FIG. 4, the adjustment assembly 100 further includes linkage 103 which is responsive to adjustment of the controller 102 and is individually connected to each slat row 80 comprising the first and second cleaning sections 76 and 78, respectively. For purposes of simultaneously adjusting the passages 96 and 98 in both cleaning section 76 and 78, any suitable form of controller such as an operator accessible lever connected to the linkage 103 will suffice.

As illustrated, the linkage 103 includes an elongated arm 104 which extends beneath the crop material receiving surface of the sieve 46 for endwise movement. As shown, the elongated arm 104 is individually connected to the each slat row 80 of the first and second cleaning sections 76 and 78, respectively. In the illustrated embodiment, arm 104 comprises first and second separate sections 105 and 106 that are joined to each other by a link 107. Notably, link 107 is articulately connected at opposite ends to the sections 105 and 106. As will be appreciated, adjustment of the linkage 103 results in simultaneous endwise displacement of the first and second sections 105 and 106 of arm 104. As such, the slat rows 60 in each cleaning section 76 and 78 are all simultaneously and angularly displaced about their respective pivot axes in response to adjustment by the adjusting assembly 100.

In the illustrated embodiment, arm 104 of linkage 103 is individually connected to each slat row 80 of the first and second cleaning sections 76 and 78, respectively, through first and second sets of connectors 108 and 110, respectively. As seen in FIG. 4, each connector in the first set of connectors 108 is of equal length to other connectors in that set and preferably comprises a depending arm 112 connected toward one end to a slat row 80 in the first cleaning section and articulately connected toward an opposite end to the first section 105 of arm 104. Each connector in the second set of connectors 110 is likewise equal in length to other connectors in that set and likewise comprises a depending arm 114 connected toward one end to a slat row 80 in the second cleaning section and articulately connected toward an opposite end to the second section 106 of arm 104.

In a most preferred form of the invention, each connector in the first and second set of connectors 108 and 110, respectively, comprises a crankarm preferably formed integrally with and intermediate the ends of the pivot member 90 connected to the slats 80. Whatever form of connector is used, it is important to note that the connectors 112 in the first set of connectors 108 have a different effective length than the connectors 114 in the second set of connectors 110. In the illustrated embodiment, the connectors 112 associated with the slat rows 80 forming the first cleaning section 76 have an effective length which is longer than the effective length of the connectors 114 associated with the slat rows 80 comprising the second cleaning section 78.

As will be appreciated, endwise movements of the arm 104 results in simultaneous displacement of each set of connectors 108 and 110 thereby causing each slat row 80 to pivot about its respective pivot axis 88. The link 107 transmits endwise movements between the sections 105 and 106 in response to endwise movements being imparted to the arm 104 while allowing the sections 105 and 106 to move along different paths dictated by tile lengths of the connectors 108 and 110. Depending upon the direction of movement of the arm 104, the passages 96, 98 in the first and second cleaning sections 76 and 78, respectively, are proportionately adjusted. Furthermore, since the first and second sets of connectors 108 and 110, respectively, are of different lengths, the slat rows 80 of the first cleaning section 76 are angularly displaced through a different angle than are the slat rows 80 of the second cleaning section in response to adjustment of the assembly 100.

As will be appreciated, the longer set of connectors 108 associated with the forward cleaning section 76 of the sieve angularly adjust the corresponding slats to a lesser degree than do the shorter set of connectors 110 associated with the aft cleaning section 78 of the sieve. It will therefore be appreciated that for a given movement of the arm 104, the grain passages 96 of the first cleaning section 76 will open or close to a lesser degree than do the grain passages 98 of the second cleaning section 78. At the extreme or limit positions of the adjusting arm 104, the following conditions are present. When the adjustment bar 104 is adjusted to an extreme "open" position, the slats in the second cleaning section 78 are angularly disposed relative to each other such that the grain passages 98 defined therebetween are more open than are the grain passages 96 associated with the slat rows of the first cleaning section 76. When the adjustment bar 104 is adjusted to a "closed" position, the slat rows of both cleaning sections 76 and 78 are closed. In the preferred form of the invention, the grain passages 96 of the first cleaning section 76 close at substantially the same time as do the grain passages 98 of the second cleaning section 78.

As mentioned above, any form of lever connected to the linkage 103 will suffice for effecting simultaneous adjustment of the passages 96 and 98 of both cleaning sections 76 and 78, respectively. Another aspect of the present invention, however, relates to an advantageous construction of the adjustment assembly 100 for angularly adjusting slat rows 80 of a combine cleaning sieve. Although the adjustment assembly 100 is illustrated in combination with other structure for effecting simultaneous adjustment of at least two cleaning sections 76 and 78 of a combine sieve, it should be appreciated that the structure of adjustment assembly 100 hereinafter described readily lends itself for use where all the slat rows of the combine sieve are equally adjusted.

As shown in FIG. 4, the preferred adjustment assembly 100 includes a controller or adjustment member 102 mounted on the combine for rotation about a fixed axis 120 and prohibited from movement along the axis 120. In the illustrated embodiment, the controller 102 includes a shank portion 122 and a drive portion 124. As shown, shank portion 122 defines a threaded section 126 which rotates in response to turning movements of the controller 102. In a preferred form of the invention, controller 102 includes a knob 127 connected to the drive portion 124 for facilitating the rotation of controller 102. As shown in FIG. 5, the periphery of the knob 127 is configured with a series of radially extending projections or knobs 129 to promote manual rotation of the controller 102.

As shown, a mounting plate 128 is provided on the combine preferably toward the rear end of the respective sieve for mounting the controller 102. An aperture 130 in the mounting plate 128 is sized to permit the free end of the shank portion 122 of controller 102 to pass to one side of the mounting plate 128 while retaining the drive portion 124 of controller 102 on an opposite side of the mounting plate 128. A retainer ring 132 is mounted along the length of the shank portion 122 in axially spaced relation and on an opposite side of the mounting plate 128 from the drive portion 124.

In the preferred form of the invention, a friction brake 134 is mounted in association with and for inhibiting free turning movement of the controller 102. As shown, brake 134 includes an annular friction brake member 135 that is mounted about the shank portion 124 and compressed between the knob 127 and the mounting plate 128. Another annular friction brake member 136 is mounted about the shank portion 124 and compressed between the retainer 132 and the opposite side of the mounting plate 128. As will be appreciated, the brakes 134 and 136 require that a certain degree of torque be imparted to the controller 102 to effect adjustment of the slat rows 80 on the sieve.

The adjustment assembly 100 further includes an actuator 138 threadably connected to the controller 102 toward one end thereof and connected to the linkage 103 for adjusting the slat rows 80 at an opposite end. Intermediate its ends, the actuator 138 passes endwise through an aperture 140 defined in a mounting plate 142 provided on the combine 10 preferably on the respective sieve. In the illustrated embodiment, mounting plate 142 extends generally parallel to the mounting plate 128. The shape of the aperture 140 and the cross-sectional configuration of that portion of the actuator 138 passing therethrough are such that the actuator 138 is prevented from rotating in response to a turning movement being imparted to the controller 102. A myriad of different shapes including a square, ellipsoid, triangle, or other suitable shapes will understandably suffice for preventing turning movement of the actuator 138 together with rotation of the controller 102. Instead, turning movement of the controller 102 will be converted into endwise movement of the actuator 138 through the threaded connection between the controller 102 and link 138.

As mentioned, the environment in the cleaning area of a combine is typically laden with dust, dirt and other particulate matter which can contaminate and/or "freeze" the threaded association or connection between the controller 102 and the actuator 138 thereby making adjustment of the sieve difficult or even impossible. To eliminate or substantially reduce dust, dirt and other contaminates from interfering with adjustment of the cleaning sieve, the adjustment assembly 100 of the present invention advantageously protects the threaded connection between the controller 102 and the actuator 138 by locating the threaded connection in a closed cavity or chamber 144. Cavity 144 is defined by at least one of said shank portion 124 on the controller 102 and the actuator or link 138 thereby preventing contaminates from interfering with the threaded connection between the controller 102 and the actuator 138 thereby facilitating adjustment of the sieve.

In the illustrated embodiment, cavity 144 is defined by an elongated blind and internally threaded bore concentrically arranged relative to the shank portion 122. The free end of the actuator 138 is provided with an externally threaded portion 146 which is endwise threadably received within the cavity 144. An annular sealing member 148 fits about the actuator 138 in sealing relationship therewith and is securely mounted at the free end of the shank portion 122 to seal the chamber 144 and thereby prevent contaminates from passing thereinto. By sealing the chamber or cavity 144, suitable lubricants can be provided on the threaded connection established between the controller 102 and the actuator 138 to facilitate adjustment of the sieve. It is well within the scope of the present invention to either reverse the order for forming the cavity 144 or otherwise suitably protect the threaded connection established between the controller 102 and the actuator 138 against contaminates thereby facilitating adjustment of the sieve.

In the illustrated form of the invention, the drive portion 124 of the controller 102 defines a tool attachment for facilitating rotation of the controller 102. In the illustrated form of the invention shown in FIGS. 4 and 5, such tool attachment preferably includes a blind tool receiving cavity or slot 152 defined by the controller 102 at an end opposite to the chamber 144. As shown, the cavity or slot 152 has a configuration for releasably accommodating a drive socket of a rachet tool or the like which will facilitate turning the controller 102 and thereby adjusting the slats on the sieve. It should be noted, however, that the cross-sectional configuration of the slot or cavity 152 can be substantially any size and shape that allows a tool to be releasably connected to the controller 102 to facilitate adjustment of the slat rows on the sieve. Alternatively, the outer surface on the drive portion 124 of the controller 102 can be configured to releasably accept a tool to facilitate adjustment of the slat rows on the sieve.

In operation, the harvesting apparatus 20 reaps the grain stalks as the combine is driven through the field. The infeed mechanism 22 delivers the crop materials from the harvesting mechanism 20 to the inlet end 30 of the separating apparatus 24. Cooperating instrumentalities on the separating apparatus impel threshed grain from the separating apparatus into the grain pan 38 from whence the material is moved to the cleaning system whereat the materials are deposited onto the sieves 46 and 48. While the separating apparatus 24 acts to separate a substantial portion of the grain from the material other than grain, some chaff, straw, tailings, and etc. is directed out of the openings in the separating apparatus along with the grain and a further cleaning or separating action is required.

Subsequent cleaning of the crop material is facilitated by the reciprocation of the sieves 46 and 48 and the air flowing from the fan 44 upwardly through the sieves. As will be appreciated, the air flows upwardly through the passages 96, 98 that are defined between the confronting upper and lower surfaces 93 and 94, respectively, on adjacent slat rows of the sieves. The space between confronting upper and lower surfaces 93 and 94, respectively, on the slat rows also separates the material in a manner allowing clean grain to fall through the sieve while moving the remaining material toward and off the end of the sieve.

As will be appreciated, the upper chaffer sieve 46 receives the majority of the materials passed from the separating apparatus 24. The cleaning sieve 46 is divided into at least two cleaning sections 76 and 78. Cleaning section 76 comprises about 12% to about 20% of the total cleaning area of the sieve 46 while cleaning section 78 defines about 60% to about 75% of the total cleaning area of the sieve.

Cleaning section. 76 defines the first set of cleaning passages 96 while cleaning section 78 defines the second set of cleaning passages 98. In a manner substantially reducing the number of pans as well as the degree of maintenance associated with the combine the present invention provides the slat adjustment assembly 100 for simultaneously adjusting both the first and second clean grain passages 96 and 98 defined by both the first and second cleaning sections 76 and 78 of the sieve through use of the slat adjustment assembly 100 having a single operator accessible controller 102.

The slat adjustment assembly 100 further comprises linkage 103 including an elongated link or arm 104 extending beneath the upper material receiving surface of the sieve. The elongated link or arm 104 of linkage is individually connected to each of the slat rows 80 of the first and second cleaning sections 76 and 78, respectively, through the first and second sets of connectors 108 and 110. Each connector or arm 112 in the first set of connectors 108 is of equal length while each connector or arm 114 in the second set of connectors 110 is of equal length. Notably, the first set of connectors 108 extending between the link 104 and each slat row 80 in the first cleaning section 76 has a different effective length than the second set of connectors 110 extending between the link 104 and each slat row in the second cleaning section 78.

The size of the grain passages 96 and 98 in the first and second cleaning sections 76 and 78, respectively, are proportionately modified by changing the angular relationship of the adjacent slat rows 80 in the respective sections of the sieve. Through adjustment of the single controller 102 on the adjustment mechanism 100, the linkage 103 endwise moves the elongated arm 104 in either endwise direction depending upon the direction of movement of the controller 102.

In the illustrated embodiment, the upper leg sections 86 of the slat rows 80 in the first cleaning section 76 are disposed at a different angular relationship relative to the frame 66 than are the upper leg sections 86 of the slat rows 80 in the second cleaning section 78. In the present invention, the cleaning passages 96 defined between adjacent slat rows 80 in the first cleaning section 76 are sized differently in a direction extending transverse to the pivot axes 88 of the slat rows 80 than are the cleaning passages 98 defined between adjacent slat rows 80 in the second cleaning section 78 so as to effect the desired separation of the cleaning action along the sieve. As will be appreciated, in an extreme or "fully" open position, the angular relationship between the slat rows of the first and second cleaning sections 76 and 78, respectively, provides that the grain passages 98 in the second cleaning section 76 are open to a greater extent than are the grain passages in the first cleaning section 76 thus yielding different separating characteristics.

With the present invention, the different separating actions between the cleaning sections 76 and 78 is proportional and by providing simultaneous adjustment of the cleaning sections 76 and 78 a tighter tolerance is maintained between the proportional separating actions between the cleaning sections through use of the single controller 102. As will be understood, the ability to maintain proper proportioning of the separating capability of the cleaning sections 76 and 78 maintains an acceptable clean sample of grain passing from the cleaning section while promoting the elongation of the crop layer or mat across the upper surface of the cleaning sieve. As will be appreciated, elongating the crop layer or mat allows enhanced distribution of the material delivered to the sieve, facilitates the flow of air from fan 44 upwardly through the sieve, and lessens or reduces the amount of material discharged from a rear edge of the sieve for refreshing thereby enhancing combine performance.

Another aspect of the present invention relates to the improved assembly for adjusting the slat rows 80 of a sieve. To effect adjustment of the angular displacement of the slat rows 80 on the sieve, the controller 102 is rotated about and inhibited from movement along the fixed axis 120. Turning the controller 102 causes rotation of the shank portion 122. The threaded connection between the threaded section 126 on the shank portion 122 and the actuator 138 results in endwise linear displacement of the actuator 138 in response to a turning movement being imparted to the controller 102. The endwise movement of the actuator 138 is transferred the linkage 103 and, thus, results in angular displacement of the slat rows 80 on the sieve. Normally, the controller 102 is inhibited from free rotation by the brakes 134 and 136.

A salient feature of the adjustment assembly concerns locating the threaded connection between the controller 102 and the actuator 138 in a cavity or chamber 144 whereby protecting the threaded connection against contaminates so prevalent in and about the cleaning area of a combine. The cavity 144 is sealed to prevent contaminates from interfering with the threaded connection and is defined by at least one of the shank portion 124 and the actuator 138.

In a most preferred form of the invention, the threaded portion on the shank portion 122 of the controller 102 is defined by an internally threaded bore which serves as the cavity 144 for protecting the threaded connection between the controller 102 and the actuator 138. The drive portion 124 of controller preferably defines a tool attachment 152 which releasably accommodates a tool and facilitates turning of the controller 102 to adjust the slat rows 60 on the sieve.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims, all such modifications as fall within the scope of the claims.

What is claimed is:

1. A cleaning system for a combine having a housing enclosing a separating apparatus for threshing grain from material other than grain, said cleaning system comprising:

a relatively high output fan mounted in said housing for producing a substantially uniform directed flow of air;

first and second reciprocally mounted cleaning sieves located in said housing in vertically spaced relation relative to each other to receive materials on an upper surface thereof and such that the directed flow of air from said fan flows from beneath each sieve to separate grain from and urge material other than grain into an airborne state for discharge downstream of said cleaning sieve, at least one of said cleaning sieves including at least first and second cleaning sections, with each cleaning section including generally parallel rows of slats arranged in adjacent relationship relative to one another, each row of slats in a cleaning section being correspondingly disposed relative to an adjacent row and with each slat row being mounted for angular adjustment about a respective pivot axis defined by an elongated pivot member connected to a respective slat row such that they will be rocked as a unit about the respective pivot axis, and whereby a first series of clean grain passages are defined between upper and lower surfaces of adjacent slat rows in the first cleaning section while a second series of clean grain passages are defined between upper and lower surfaces of adjacent slat rows in the second cleaning section; and a slat adjustment assembly for simultaneously adjusting the openings between adjacent rows of slats of both cleaning sections of said at least one cleaning sieve, said adjustment assembly including linkage extending beneath the crop receiving upper surface of the cleaning sieve and connected to each slat row of said first and second cleaning sections and responsive to manipulation of a single operator accessible controller, said controller being mounted for rotation about a fixed axis and prohibited for movement along said axis, with said controller including a threaded section that rotates with said controller, and wherein said linkage is threadably connected to the threaded section on the controller such that rotation of said controller effects endwise movement of said linkage to change the angular relationship of the slats relative to each other and thus modifying the cleaning effectiveness of the cleaning system, and wherein the threaded connection between the threaded section of the controller and said linkage is located within a sealed cavity thereby protecting the threaded connection from contaminants to facilitate adjustment of the adjustment assembly.

2. The cleaning system according to claim 1 wherein said at least one of said sieves further includes a generally rectangular frame with said first and second cleaning sections being arranged in a fore-and-aft relationship relative to one another and between opposite side edges of said frame.

3. The cleaning system according to claim 1 wherein each grain passage in the first and second cleaning sections is relatively narrow in a first direction and elongated in a second direction, with the grain passages in the first cleaning section being smaller in size in the first direction than are the grain passages in the second cleaning section to promote movement of crop materials from the first section to the second section.

4. The cleaning system according to claim 1 wherein the first cleaning section defines about 15% of the surface cleaning area of said at least one of said sieves while the second cleaning area defines about 66% of the surface cleaning area of said at least one of said sieves.

5. The cleaning system according to claim 1 wherein the linkage of the adjustment assembly is connected to each slat row by a crankarm extending radially from and between opposite ends of each respective pivot member.

6. The cleaning system according to claim 5 wherein the slat rows of the first and second cleaning sections are disposed in overlapping relationship transversely of the slat row pivot axis.

7. The cleaning system according to claim 6 wherein the crankarms on those slat rows associated with the first cleaning section have an effective length which is different from the crankarms associated with the slat rows forming the second cleaning section such that upon adjustment of the adjustment assembly the overlapping relationship between adjacent slat rows and thereby the passages between the slat rows of the first and second cleaning sections are adjusted at different rates for a given movement of the linkage of the adjustment assembly.

8. The cleaning system according to claim 1 wherein said at least one cleaning sieve further includes first and second sets of connectors, said first set of connectors being connected to and extending radially from the pivot members associated with those slat rows forming the first cleaning section while the second set of connectors are connected to and extend radially from the pivot members associated with those slat rows forming the second cleaning section, each set of connectors being articulately connected to the linkage of the adjusting assembly such that as said linkage moves in response to manipulation of the adjusting assembly the angular disposition of the slat rows are likewise moved, and wherein one set of connectors has a different effective length than the other set of connectors so that the slat rows comprising the first and second cleaning sections close at different rates upon movement of said linkage of the adjusting assembly.

9. A sieve assembly for an agricultural combine, comprising:

a rigid and substantially rectangular frame having a forward edge, a rear edge, and opposite side edges joined to the forward and rear edges;

a first cleaning section defined by a series of parallel and generally correspondingly and angularly disposed slats extending between said side edges and rearwardly from the forward edge of the frame, each slat in the first cleaning section being mounted for movement about a pivot axis defined by an elongated pivot member, each pivot member having intermediate the ends thereof a crank arm extending radially away from the pivot axis for rocking a respective slat, and wherein a series of passages are defined between upper and lower surfaces of adjacent slats in the first cleaning section;

a second cleaning section defined by a series of parallel and generally correspondingly disposed slats extending between said side edges and rearwardly from the first cleaning section, each slat in the second cleaning section being mounted for movement about a pivot axis defined by an elongated pivot member, each pivot member having intermediate the ends thereof a crank arm extending radially away from the pivot axis for rocking a respective slat, and wherein a series of passages are defined between upper and lower surfaces of adjacent slats in the second cleaning section;

a slat adjustment assembly including an endwise movable linkage connected to each crank arm extending way from the pivot axis of each slat defining the first and second cleaning sections for simultaneously adjusting the angular disposition of the slats and thereby conjointly controlling the size of the series of passages in the first and second cleaning sections through use of a single controller connected to said linkage, wherein said controller is mounted toward a rear end of the sieve for rotation about a fixed axis and prohibited from displacement along said axis, with said controller including a threaded section which rotates with said controller, and with said linkage being threadably connected to the threaded section on the controller such that rotation of said controller effects endwise movement of said linkage thereby changing the angular relationship of the slats relative to each other thus changing the cleaning effectiveness of the sieve assembly, and with the threaded connection between the threaded section on the controller and linkage being located within a cavity defined by said controller thereby protecting the threaded connection from contaminates and thus facilitating operation of the adjustment assembly.

10. The sieve assembly according to claim 9 wherein the slats of the first and second cleaning sections each comprise a central section to which the pivot member is secured and upper and lower sections extending in angular relation from the center section.

11. The sieve assembly according to claim 10 wherein the slats are arranged in overlapping relation relative to each other, and wherein, when the slats of the first and second cleaning sections are in a fully open position, the upper sections of the slats in the first cleaning section are disposed at a different angular relationship relative to the frame than are the upper sections of the slats in the second cleaning section.

12. The sieve assembly according to claim 9 wherein the upper sections of the slats in both cleaning sections defines an escalloped outer edge.

13. The sieve assembly according to claim 9 wherein, when the slats in both the first and second cleaning sections are in a fully open position, the passages defined between upper and lower surfaces of adjacent slats in the first cleaning section measure about 0.50 inches to about 0.750 inches in a direction transverse to the pivot axes of the slats while the passages between upper and lower surfaces of adjacent slats in the second cleaning section measure about 0.750 inches to about 1.00 inches, respectively, in a direction transverse to the pivot axes of the slats.

14. The sieve assembly according to claim 9 wherein the first cleaning section defines about 12% to about 22% of the cleaning area of the sieve assembly while the second cleaning section defines about 55% to about 70% of the cleaning area of the sieve assembly.

15. A mechanism for angularly adjusting a plurality of slats pivotally mounted on a combine sieve in overlapping relation relative to one another thereby regulating the size of an opening defined between upper and lower surfaces of adjacent slats, a plurality of elongated pivot members extending longitudinally of and connected to the slats such that they will be rocked as a unit, said adjustment mechanism comprising:

a controller adapted to be mounted for rotation about a fixed axis and prohibited from endwise movement along said axis, said controller including an actuation portion adapted to be arranged relative to the sieve for operator accessibility and a shank portion, said shank portion defining a lengthwise threaded section which rotates in response to rotation of said actuation portion;

an elongated actuator non-rotatably mounted and arranged in operative association with the pivot members on the sieve, said actuator being threadably associated along a lengthwise portion thereof with the lengthwise threaded section of said shank portion such that rotation of said controller effects endwise movement of said elongated actuator; and wherein the entire lengthwise threaded section on the controller and the entire threaded lengthwise portion of said actuator being located in a sealed cavity defined by at least one of said shank portion and said actuator thereby preventing contaminates from interfering with the threaded association between said threaded section on the adjustment member and said actuator thereby facilitating adjustment of the slats upon rotation of said controller.

16. The combine sieve adjusting mechanism according to claim 15 wherein said actuation portion of said controller is configured to accommodate a tool for facilitating rotation of said controller.

17. The combine sieve adjusting mechanism according to claim 15 wherein said actuation portion of said controller is configured as a knob to facilitate rotation of said controller about said fixed axis of rotation.

18. The combine sieve adjusting mechanism according to claim 15 wherein said shank portion of said controller defines an internally threaded cavity, and wherein said elongated actuator is provided with an externally threaded portion that is threadably received within said internally threaded cavity of said controller such that upon rotation of said controller said actuator is endwise displaced thus modulating the opening defined between adjacent slats.

19. The combine sieve adjusting mechanism according to claim 15 wherein said controller further includes a brake for inhibiting inadvertent rotation of said controller about said axis.

20. A mechanism for angularly adjusting a plurality of slats pivotally mounted on a combine sieve to regulate the size of the passages defined between upper and lower surfaces of adjacent slats, said adjustment mechanism comprising:

a controller mounted for rotation about a fixed axis and prohibited from endwise movement along said axis, said controller including a shank portion defining a lengthwise threaded section which rotates in response to rotation of said controller;

a nonrotatable elongated actuator connected to and for angularly displacing each pivotally mounted slat in response to endwise movement thereof, said actuator being threadably associated along a lengthwise portion thereof with the lengthwise threaded section of said shank portion such that rotation of said controller effects endwise movement of the actuator; and wherein the entire lengthwise threaded section on the controller and the entire lengthwise threaded portion of said actuator are located in a cavity which is sealed, said cavity being defined by at least one of said shank portion and said actuator to prevent contaminates from interfering with the threaded association between said threaded section on the adjustment member and said actuator thereby facilitating adjustment of the slats upon rotation of said controller.

21. The mechanism according to claim 20 wherein said controller further includes a knob that is connected to said shank portion.

22. The adjusting mechanism according to claim 20 wherein said controller is configured to releasably accommodate a tool for facilitating rotation of said controller and thereby adjustment of said mechanism.

23. The adjusting mechanism according to claim 20 wherein the shank portion of said controller defines an internally threaded cavity, and wherein said elongated actuator is provided with an externally threaded portion that is threadably arranged within said internally threaded cavity of said controller such that upon rotation of said controller said actuator is endwise displaced thus modifying the size of the passages defined between adjacent slats of the combine sieve.

24. A cleaning system for a combine having a housing enclosing a separating apparatus for threshing grain from material other than grain, said cleaning system comprising:

a relatively high output fan mounted in said housing for producing a substantially uniform directed flow of air;

a reciprocally mounted cleaning sieve located in said housing to receive materials on an upper surface thereof and such that the directed flow of air from said fan flows from beneath said sieve to separate grain from and urge material other than grain into an airborne state for discharge downstream of said cleaning sieve, said cleaning sieve including generally parallel rows of slats arranged in adjacent relationship relative to one another, each row of slats being correspondingly disposed relative to an adjacent row and with each slat row being mounted for angular adjustment about a respective pivot axis defined by an elongated pivot member connected to a respective slat row such that they will be rocked as a unit about the respective pivot axis, and whereby a series of clean grain passages are defined between upper and lower surfaces of adjacent slat rows; and a slat adjustment assembly for simultaneously adjusting the size of the clean grain passages defined between adjacent rows of slats of said cleaning sieve, said adjustment assembly including linkage extending beneath the crop receiving upper surface of the cleaning sieve and connected to each slat row of said cleaning sieve, an operator accessible controller rotatably mounted on said combine, and a threaded connection operably disposed between said controller and said linkage, said threaded connection including a first member connected to and rotatable with said controller, said first member being rotatable about a fixed axis while being prevented from movement endwise along said axis, and a non-rotatable endwise movable second member connected toward one end to said linkage and threadably connected toward an opposite end to said first member, said second member being mounted in general axial alignment with said first member such that upon rotation of said controller and said first member said second member is endwise displaced thus modifying the angular disposition of the slat rows and thereby adjusting cleaning effectiveness of said sieve, and wherein at least one of said first and second members of said threaded connection defines a sealed cavity wherein the threaded connection between said first and second members is protectively disposed.

25. The cleaning system according to claim 24 wherein the controller of said slat adjustment assembly is configured to releasably accommodate a tool to facilitate rotation of said controller.

26. The cleaning system according to claim 24 wherein said first member of said threaded connection defines an internally threaded cavity, and wherein said second member of said threaded connection is provided with an externally threaded portion that is threadably received within said internally threaded cavity of said first member such that upon rotation of said controller and thereby the first member said second member endwise moves thus displacing the linkage connected thereto thereby modifying the angular disposition of the slats rows on said sieve.

27. The cleaning system according to claim 24 wherein said slat adjustment assembly further includes a seal arranged in operable combination with and between said first and second members of said threaded connection for inhibiting contaminants from entering said cavity.

28. A mechanism for angularly adjusting a plurality of slats pivotally mounted on a combine sieve in overlapping relation relative to one another thereby regulating the size of an opening defined between upper and lower surfaces of adjacent slats, a plurality of elongated pivot members extending longitudinally of and connected to the slats such that they will be rocked as a unit, said adjustment mechanism comprising:

a controller adapted to be mounted for rotation about a fixed axis and prohibited from endwise movement along said axis, said controller including an actuation portion adapted to be arranged relative to the sieve for operator accessibility and a shank portion, said shank portion defining an internally threaded cavity, and wherein the internal threading within said cavity rotates in response to rotation of the actuation portion of said controller;

an elongated actuator non-rotatably mounted and arranged in operative association with the pivot members on the sieve, said actuator being provided with an externally threaded portion that is threadably received within said internally threaded cavity of said controller such that rotation of said controller effects endwise movement of said elongated actuator thus modulating the opening defined between adjacent slats; and wherein said controller further includes a seal arranged about said actuator and in operable combination with the shank portion of said controller for sealing said cavity and thereby inhibiting contaminants from interfering with the threaded connection between said controller and said actuator.

29. A mechanism for angularly adjusting a plurality of slats pivotally mounted on a combine sieve to regulate the size of the passages defined between upper and lower surfaces of adjacent slats, said adjustment mechanism comprising;

a controller mounted for rotation about a fixed axis and prohibited from endwise movement along said axis, said controller including a shank portion having an internal threaded cavity, and wherein the internal threading in said cavity turns with said shank portion in response to rotation of said controller;

a nonrotatable elongated actuator connected to and for angularly displacing each pivotally mounted slat in response to endwise movement thereof, said actuator including an externally threaded portion that is threadably associated with internal threading of said shank portion on said controller such that rotation of said controller effects endwise movement of the actuator; and wherein said controller further includes a seal arranged about said actuator and in operable association with the shank portion of said controller for sealing said internally threaded cavity and thereby inhibiting contaminants from interfering with the threaded connection between said controller and said actuator.

30. A mechanism for angularly adjusting a plurality of slats pivotally mounted on a combine sieve in overlapping relation relative to one another thereby regulating the size of an opening defined between upper and lower surfaces of adjacent slats, a plurality of elongated pivot members extending longitudinally of and connected to the slats such that they will be rocked as a unit, said adjustment mechanism comprising:

an operator accessible rotatable controller;

linkage extending beneath the upper surface of said slats, said linkage being individually connected to each pivot member of each slat such that displacement of said linkage effects angular adjustment of the slats; and a threaded connection operably disposed between said controller and said linkage, said threaded connection including a first member connected to and rotatable with said controller, said first member being rotatable about a fixed axis while being prevented from movement endwise along said axis, and a non-rotatable endwise movable second member connected toward one end to said linkage and threadably connected toward an opposite end to said first member, said second member being mounted in general axial alignment with said first member such that upon rotation of said controller and said first member said second member is endwise displaced thus modifying the angular disposition of the slat rows and thereby adjusting the cleaning effectiveness of said sieve, and wherein at least one of said first and second members of said threaded connection defines a sealed cavity wherein the threaded connection between said first and second members is protectively arranged.

* * * * *